(12) United States Patent
Takeuchi et al.

(10) Patent No.: US 10,941,950 B2
(45) Date of Patent: Mar. 9, 2021

(54) AIR CONDITIONING CONTROL DEVICE, AIR CONDITIONING CONTROL METHOD AND NON-TRANSITORY COMPUTER READABLE MEDIUM

(71) Applicant: KABUSHIKI KAISHA TOSHIBA, Tokyo (JP)

(72) Inventors: Ryosuke Takeuchi, Tokyo (JP); Toru Yano, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 98 days.

(21) Appl. No.: 15/265,962

(22) Filed: Sep. 15, 2016

(65) Prior Publication Data

US 2017/0254554 A1 Sep. 7, 2017

(30) Foreign Application Priority Data

Mar. 3, 2016 (JP) .............................. JP2016-041369

(51) Int. Cl.
*F24F 11/30* (2018.01)
*F24F 11/65* (2018.01)
(Continued)

(52) U.S. Cl.
CPC .............. *F24F 11/30* (2018.01); *F24F 11/62* (2018.01); *F24F 11/65* (2018.01); *G05B 15/02* (2013.01);
(Continued)

(58) Field of Classification Search
CPC ............. F24F 11/62; G05B 2219/2614; G05B 13/048; G05B 13/028; G05B 2219/42152; G05B 23/0224; G06N 99/005
See application file for complete search history.

(56) References Cited

U.S. PATENT DOCUMENTS 4,455,453 A * 6/1984 Parasekvakos ...... H04M 11/002
340/3.3
6,478,084 B1 * 11/2002 Kumar ................. F24F 11/0012
165/238
(Continued)

FOREIGN PATENT DOCUMENTS

JP   H6-331199    11/1994
JP    3039370     7/1997
(Continued)

OTHER PUBLICATIONS

Takeuchi et al., Estimation of comfortable room temperature by survival analysis, CLIMA 2016—proceedings of the 12 REHVA World Congress, 2016.*
(Continued)

*Primary Examiner* — Darrin D Dunn
(74) *Attorney, Agent, or Firm* — Finnegan, Henderson, Farabow, Garrett & Dunner, L.L.P.

(57) ABSTRACT

An air conditioning control device as an aspect of the present invention includes a processor configured to execute a program to provide at least a control period calculator and a control instructor. The control period calculator calculates, based on control history about control over an air conditioning device and operation history about operations of the air conditioning device, a control period during which the control is maintained. The control instructor gives an instruction to the air conditioning device to cause the control to be maintained until the control period elapses after start of the control.

12 Claims, 16 Drawing Sheets

(51) Int. Cl.
*G05B 15/02* (2006.01)
*F24F 11/62* (2018.01)
*G05B 19/042* (2006.01)
*F24F 120/20* (2018.01)
*F24F 11/64* (2018.01)
*F24F 11/46* (2018.01)
*F24F 110/10* (2018.01)
*F24F 11/61* (2018.01)

(52) U.S. Cl.
CPC ............ *G05B 19/042* (2013.01); *F24F 11/46* (2018.01); *F24F 11/61* (2018.01); *F24F 11/64* (2018.01); *F24F 2110/10* (2018.01); *F24F 2120/20* (2018.01); *G05B 2219/2614* (2013.01); *G05B 2219/49068* (2013.01)

(56) References Cited

U.S. PATENT DOCUMENTS

| | | | | |
|---|---|---|---|---|
| 6,540,017 | B2 | 4/2003 | Sugawara et al. | |
| 7,000,154 | B1* | 2/2006 | LeDuc | G06F 11/0715 714/47.2 |
| 7,539,559 | B2* | 5/2009 | Kanai | F24F 11/30 700/277 |
| 7,784,704 | B2* | 8/2010 | Harter | G05D 23/1904 236/1 C |
| 8,010,700 | B2* | 8/2011 | Brown | H04L 67/22 709/244 |
| 8,098,038 | B2* | 1/2012 | Okita | G05B 19/19 318/39 |
| 9,020,647 | B2* | 4/2015 | Johnson | F24F 11/001 700/277 |
| 9,429,961 | B2* | 8/2016 | Sprinkle | G05D 23/1917 |
| 9,509,763 | B2* | 11/2016 | Canoy | G06N 99/005 |
| 2001/0027862 | A1* | 10/2001 | Sugawara | G05D 23/1904 165/238 |
| 2005/0096797 | A1* | 5/2005 | Matsubara | H02J 3/00 700/291 |
| 2007/0043478 | A1* | 2/2007 | Ehlers | F24F 11/30 700/276 |
| 2007/0116013 | A1* | 5/2007 | Brown | G06Q 10/06 370/395.53 |
| 2008/0272934 | A1* | 11/2008 | Wang | H02J 3/14 340/870.11 |
| 2008/0277486 | A1* | 11/2008 | Seem | H04L 67/125 236/49.3 |
| 2010/0217642 | A1* | 8/2010 | Crubtree | G06Q 10/00 705/7.12 |
| 2011/0132991 | A1* | 6/2011 | Moody | G05D 23/1902 236/46 R |
| 2011/0133681 | A1* | 6/2011 | Okita | G05B 19/19 318/561 |
| 2011/0184565 | A1* | 7/2011 | Peterson | G05D 23/1923 700/278 |
| 2012/0221150 | A1* | 8/2012 | Arensmeier | G05B 23/0224 700/276 |
| 2012/0239221 | A1* | 9/2012 | Mighdoll | G05D 23/1902 700/300 |
| 2012/0245868 | A1* | 9/2012 | Imahara | H02J 3/00 702/61 |
| 2012/0259469 | A1* | 10/2012 | Ward | G05B 15/02 700/276 |
| 2013/0099011 | A1* | 4/2013 | Matsuoka | G05D 23/1904 236/1 C |
| 2013/0268125 | A1* | 10/2013 | Matsuoka | G05D 23/1905 700/276 |
| 2013/0325189 | A1* | 12/2013 | Miura | G05D 23/19 700/276 |
| 2014/0100700 | A1* | 4/2014 | Matsumoto | G05D 23/19 700/276 |
| 2014/0142862 | A1* | 5/2014 | Umeno | G06Q 50/06 702/19 |
| 2014/0188290 | A1* | 7/2014 | Steinberg | G05B 19/0426 700/278 |
| 2014/0277756 | A1* | 9/2014 | Bruce | F24F 11/0086 700/276 |
| 2014/0277765 | A1* | 9/2014 | Karimi | G05B 15/02 700/276 |
| 2014/0277768 | A1* | 9/2014 | Watts | G05D 23/1905 700/278 |
| 2014/0316584 | A1* | 10/2014 | Matsuoka | G05D 23/1917 700/278 |
| 2015/0039135 | A1* | 2/2015 | Mori | H02J 3/14 700/276 |
| 2015/0045966 | A1* | 2/2015 | Chen | G05B 13/042 700/277 |
| 2015/0241079 | A1* | 8/2015 | Matsuoka | H04L 12/2825 700/276 |
| 2015/0286226 | A1* | 10/2015 | Fadell | G06Q 10/20 700/276 |
| 2015/0316286 | A1* | 11/2015 | Roher | F24F 11/0012 700/276 |
| 2015/0330654 | A1* | 11/2015 | Matsuoka | G05D 23/1905 700/278 |
| 2016/0091219 | A1* | 3/2016 | Steinberg | G05B 19/0426 700/278 |
| 2016/0123617 | A1* | 5/2016 | Vega | F24F 11/006 706/12 |
| 2016/0123618 | A1* | 5/2016 | Hester | F24F 11/006 700/276 |
| 2016/0123619 | A1* | 5/2016 | Hester | F24F 11/006 700/276 |
| 2016/0139582 | A1* | 5/2016 | Matsuoka | G05B 15/02 700/276 |
| 2016/0161138 | A1* | 6/2016 | Fadell | G06Q 10/20 700/278 |
| 2016/0169547 | A1* | 6/2016 | Matsuoka | G05D 23/1904 700/278 |
| 2016/0195289 | A1* | 7/2016 | Matsuoka | G05D 23/1917 700/278 |
| 2016/0201934 | A1* | 7/2016 | Hester | F24F 11/30 700/276 |
| 2016/0223217 | A1* | 8/2016 | Buda | F24F 11/30 |
| 2016/0223218 | A1* | 8/2016 | Barrett | F24F 11/006 |
| 2016/0267547 | A1* | 9/2016 | Umeno | G06Q 10/04 |
| 2016/0320081 | A1* | 11/2016 | Nikovski | F24F 11/006 |
| 2016/0321564 | A1* | 11/2016 | Imahara | H04Q 9/00 |
| 2016/0339300 | A1* | 11/2016 | Todasco | H04W 4/80 |
| 2017/0045864 | A1* | 2/2017 | Fadell | G05D 23/1904 |
| 2017/0051925 | A1* | 2/2017 | Stefanski | F24F 11/30 |
| 2017/0060629 | A1* | 3/2017 | Vora | G06F 17/2705 |
| 2017/0069008 | A1* | 3/2017 | Wang | H02J 3/14 |
| 2017/0074540 | A1* | 3/2017 | Daubman | G05B 15/02 |
| 2017/0074541 | A1* | 3/2017 | Bentz | H04W 4/80 |
| 2017/0139384 | A1* | 5/2017 | Takeuchi | G05B 13/048 |
| 2017/0282912 | A1* | 10/2017 | Chan | B60W 30/025 |
| 2017/0285596 | A1* | 10/2017 | Hunt | G05B 19/042 |
| 2017/0343229 | A1* | 11/2017 | Matsuoka | H04L 12/2825 |
| 2018/0045427 | A1* | 2/2018 | Yoshikawa | F24F 2120/10 |
| 2018/0051901 | A1* | 2/2018 | Saintellemy | G05B 19/0426 |
| 2018/0252428 | A1* | 9/2018 | Malcolm | F24F 11/46 |
| 2018/0299163 | A1* | 10/2018 | Matsuoka | H04L 12/2829 |

FOREIGN PATENT DOCUMENTS

| | | |
|---|---|---|
| JP | 2001-272075 | 10/2001 |
| JP | 2006-105571 | 4/2006 |
| JP | 2007-315613 | 12/2007 |
| JP | 2008-190784 | 8/2008 |
| JP | 4171006 | 10/2008 |
| JP | 2010-65960 | 3/2010 |
| JP | 2011-38718 A | 2/2011 |
| JP | 2011-064344 | 3/2011 |
| JP | 2012-57915 | 3/2012 |
| JP | 4950617 | 6/2012 |
| JP | 2012-225609 A | 11/2012 |
| JP | 5222257 | 6/2013 |

(56) References Cited

FOREIGN PATENT DOCUMENTS

| JP | 5227707 | 7/2013 |
| JP | 2013-249991 A | 12/2013 |
| JP | 2015-502512 | 1/2015 |

OTHER PUBLICATIONS

Gunay (A critical review of observation studies, modeling, and simulation of adaptive occupant behaviors in offices, Building and Environment 70 (2013) 31-47) (Year: 2013).*
JP 2008-190784—An English-language abstract of this document is enclosed.
JP 2012-57915—An English-language abstract of this document is enclosed.
JP H6331199—An English-language abstract of this document is enclosed.
JP 2001-272075—This document corresponds to U.S. Pat. No. 6,540,017.
JP 2015-502512—This document corresponds to U.S. Publication No. 2015-0241079.
JP 4171006—An English-language abstract of corresponding Japanese Application Publication No. 2005-257270 of this document is enclosed.
JP 3039370—An English-language Machine Translation of this document is enclosed.
JP 4950617—An English-language abstract of corresponding Japanese Application Publication No. 2008-101799 of this document is enclosed.
JP 5222257—An English-language abstract of corresponding Japanese Application Publication No. 2009-212810 of this document is enclosed.
JP 5227707—An English-ianguage abstract of corresponding Japanese Application Publication No. 2010-065960 of this document is enclosed.
JP 2006-105571—An English-language abstract of this document is enclosed.
JP 2007-315613—An English-language abstract of this document is enclosed.
JP 2010-65960—An English-language abstract of this document is enclosed.
JP 2011-064344—an English-language abstract of this document is enclosed.
R. Takeuchi "Estimation of Comfortable Room Temperature by Survival Analysis", JSA 12014 (Mar. 2014). An English-language abstract of this document is found on p. 1 of the document.
T. Yano "Evaluation of the Estimation Method of Acceptable Room Temperatures by French Residential Data" Transactions on Electronics, Information and Systems, vol. 136, (2016). An English-language abstract of this document is found on p. 1 of the document.
R. Takeuchi, et al. "Estimation of Comfortable Room Temperature by Survival Analysis", The $28^{th}$ Annual Conference of the Japanese Society for Artificial Intelligence. JSAI2004, pp. 1-4, Mar. 2014.
R. Takeuchi et al. "Estimation of Comfortable Room Temperature by Survival Analysis", Proc. CLIMA 2016, 10 pages, Mar. 2016.
R. Takeuchi, et al. "Estimation of Comfortable Room Temperature by Survival Analysis in NEDO Lyon Project HEMS". The $6^{th}$ International Conference on Integration of Renewable and Distribgted Energy Resources IRED2014, 2 pages, (2014).
T. Yano "Evaluation of the Estimation Method of Acceptable Room Temperatures by French Residential Data" The Institute of Electrical Engineers of Japan, Transactions on Electronics, Information and Systems, vol. 136, No. 6, pp. 852-857, 2016.

* cited by examiner

| DATE AND TIME | OPERATING STATE | SET TEMPERATURE | ROOM TEMPERATURE | INPUT SOURCE USER/SYSTEM |
|---|---|---|---|---|
| 2015/7/1 10:39 | AIR COOLING | 26°C | 26°C | - |
| 2015/7/1 10:40 | STOP | - | 26°C | SYSTEM |
| 2015/7/1 10:41 | STOP | - | 26°C | - |
| ... | ... | ... | ... | ... |
| 2015/7/1 10:59 | STOP | - | 30°C | - |
| 2015/7/1 11:00 | AIR COOLING | 26°C | 30°C | USER |
| 2015/7/1 11:01 | AIR COOLING | 26°C | 30°C | - |
| ... | ... | ... | ... | ... |
| 2015/7/1 11:29 | AIR COOLING | 26°C | 26°C | - |
| 2015/7/1 11:30 | STOP | - | 26°C | SYSTEM |
| 2015/7/1 11:31 | STOP | - | 26°C | - |
| ... | ... | ... | ... | ... |
| 2015/7/1 11:59 | STOP | - | 30°C | - |
| 2015/7/1 12:00 | AIR COOLING | 26°C | 30°C | USER |
| ... | ... | ... | ... | ... |

FIG.2

| CONTROL CONDITION | | CONTENT OF CONTROL | | | CONTROL PERMISSION |
|---|---|---|---|---|---|
| OPERATING STATE BEFORE CONTROL | SET TEMPERATURE BEFORE CONTROL | OPERATING STATE AFTER CONTROL | SET TEMPERATURE AFTER CONTROL | CONTROL PERIOD | |
| AIR COOLING | 27°C | STOP | - | 10 MINUITES | PERMITTED |
| AIR COOLING | 26°C | STOP | - | 12 MINUITES | |
| AIR COOLING | 25°C | STOP | - | - | UNPERMITTED |
| AIR COOLING | 25°C | AIR COOLING | 26°C | - | UNPERMITTED |
| AIR COOLING | 24°C | VENTILATION | - | - | UNPERMITTED |

FIG. 3

| START DATE AND TIME | CONTROL CONDITION | | CONTENT OF CONTROL | | SURVIVAL TIME |
|---|---|---|---|---|---|
| | OPERATING STATE BEFORE CONTROL | SET TEMPERATURE BEFORE CONTROL | OPERATING STATE AFTER CONTROL | SET TEMPERATURE AFTER CONTROL | |
| 2015/7/1 10:40 | AIR COOLING | 26°C | STOP | – | 20 MINUTES |
| 2015/7/1 11:30 | AIR COOLING | 26°C | STOP | – | 30 MINUTES |
FIG.4A
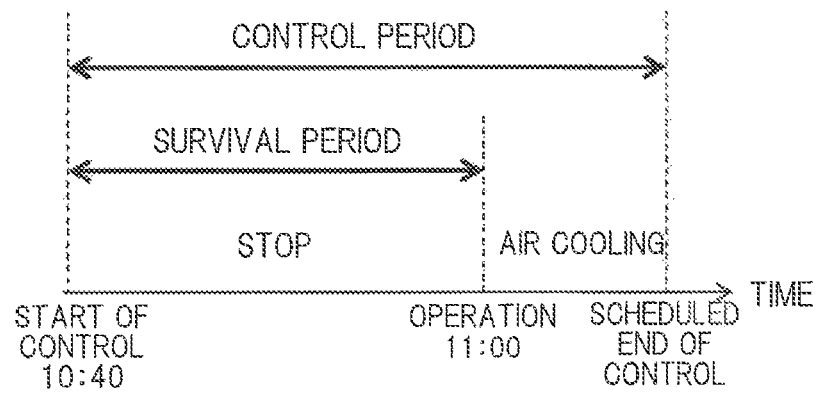
FIG.4B
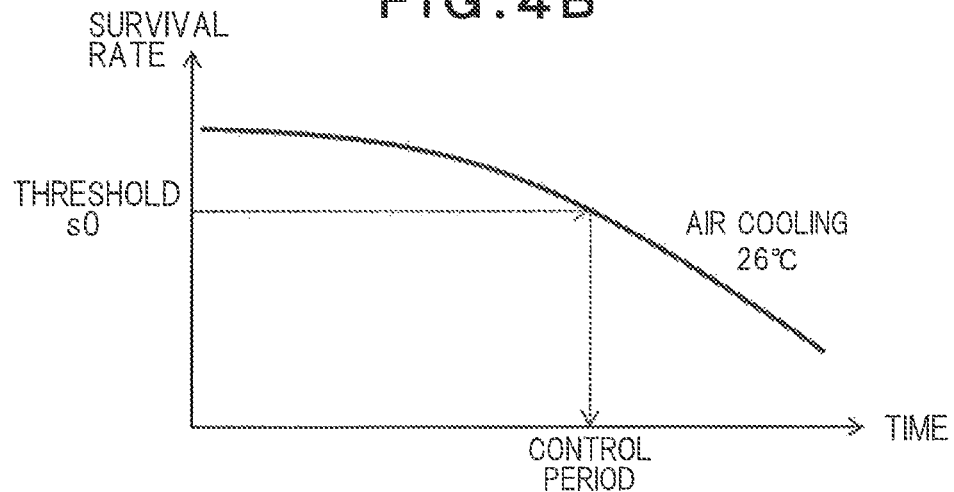
FIG.4C

| DATE AND TIME | ATTRIBUTE | VALUE |
|---|---|---|
| 2015/7/1 10:39 | EXTERNAL TEMPERATURE | 32°C |
| 2015/7/1 10:39 | ROOM TEMPERATURE | 26°C |
| 2015/7/1 10:40 | EXTERNAL TEMPERATURE | 32°C |
| 2015/7/1 10:40 | ROOM TEMPERATURE | 26°C |
| ... | ... | ... |

FIG.10

| DATE AND TIME | ATTRIBUTE | VALUE |
|---|---|---|
| 2015/7/1 10:39 | EXTERNAL TEMPERATURE | 32°C |
| 2015/7/1 10:39 | ROOM TEMPERATURE | 26°C |
| 2015/7/1 10:39 | POWER CONSUMPTION | 600W |
| 2015/7/1 10:40 | EXTERNAL TEMPERATURE | 32°C |
| 2015/7/1 10:40 | ROOM TEMPERATURE | 26°C |
| 2015/7/1 10:40 | POWER CONSUMPTION | 600W |
| ... | ... | ... |

FIG.12

AIR CONDITIONING CONTROL DEVICE, AIR CONDITIONING CONTROL METHOD AND NON-TRANSITORY COMPUTER READABLE MEDIUM

CROSS-REFERENCE TO RELATED APPLICATION(S)

This application is based upon and claims the benefit of priority from Japanese Patent Application No. 2016-041369, filed Mar. 3, 2016; the entire contents of which are incorporated herein by reference.

FIELD

Embodiments described herein relate generally to an air conditioning control device, an air conditioning control method and a non-transitory computer readable medium.

BACKGROUND

In the case of using air conditioning in an office or the like, there is a possibility that comfortableness is damaged by aiming at energy saving. On the contrary, there is a possibility that energy saving is not achieved by aiming at comfortableness. Thus, energy saving and comfortableness can be said to be in a tradeoff relationship. Therefore, there is a demand for an air conditioning control device capable of maintaining comfortableness at a level acceptable to a user of air conditioning and obtaining an energy saving effect.

In order to judge whether or not an air conditioning control device gives comfortableness at a level acceptable to a user of air conditioning, it is necessary to cause the user of air conditioning to make a notification about comfortableness and generate a judgment criterion based on a result of the notification. However, there is a possibility that dissatisfaction of the user is caused since the notification is bothered, and a problem occurs that a function of receiving the notification has to be added.

BRIEF DESCRIPTION OF THE DRAWINGS

FIG. 2 is a diagram illustrating an example of information stored in a history storage;

FIG. 3 is a diagram illustrating an example of control rules stored in a control rule storage;

FIGS. 4A, 4B and 4C are diagrams illustrating calculation of a control period;

FIG. 10 is a diagram illustrating an example of environmental information stored in an environmental history storage;

FIG. 12 is a diagram illustrating another example of the environmental information stored in the environmental history storage;

DETAILED DESCRIPTION

An air conditioning control device as an aspect of the present invention includes a processor configured to execute a program to provide at least a control period calculator and a control instructor.

The control period calculator calculates, based on control history about control over an air conditioning device and operation history about operations of the air conditioning device, a control period during which the control is maintained.

The control instructor gives an instruction to the air conditioning device to cause the control to be maintained until the control period elapses after start of the control.

Below, a description is given of embodiments of the present invention with reference to the drawings. The present invention is not limited to the embodiments.

First Embodiment

Figure 1:
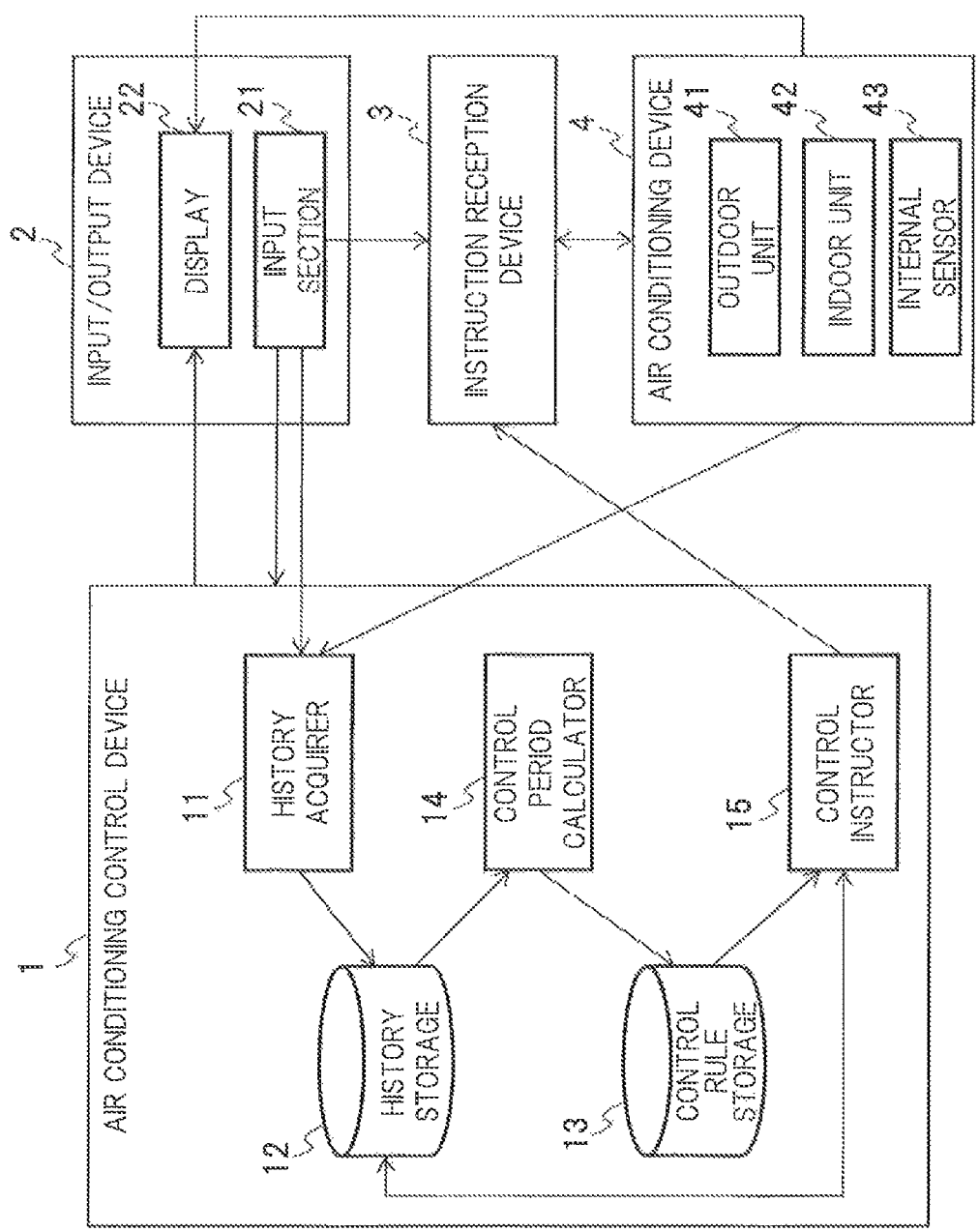
FIG. 1 is a block diagram illustrating a schematic configuration of an air conditioning system according to a first embodiment.

FIG. 1 is a block diagram illustrating a schematic configuration of an air conditioning system according to a first embodiment. The air conditioning system of the first embodiment is configured with an air conditioning control device 1, an input/output device 2, an instruction reception device 3 and an air conditioning device 4.

The air conditioning control device 1 is provided with a history acquirer 11, a history storage 12, a control rule storage 13, a control period calculator 14 and a control instructor 15.

The air conditioning control device 1 controls the air conditioning device 4. However, a period during which the air conditioning control device 1 controls conditioning device 4 is limited. For example, if the air conditioning control device 1 performs control to stop air cooling when the air conditioning device 4 performs air cooling, the air conditioning device 4 stops during a certain period. After elapse of the certain period, however, the control ends, and the air conditioning device 4 performs air cooling again. Here, the certain period during which control over the air conditioning device 4 is maintained is referred to as a control period. The air conditioning control device 1 automatically calculates the control period without using notification data from a user of the air conditioning device 4. The control may end by an operation from the user even during the control period. Details will be described later.

The input/output device 2 is provided with an input section 21 to receive an instruction to the air conditioning device 4 and give the instruction to the air conditioning device 4 by being operated by the user or the like. The air conditioning device 4 performs an action based on the instruction. The input section 21 may receive an instruction to the air conditioning control device 1 and give the instruction to the air conditioning control device 1. For example, the input section 21 is capable of updating "permitted" and "unpermitted" of control rules stored in the control rule storage 13 by being operated by the user or the like. Further, the input/output device 2 may be provided with a display 22 to display information such as a state of the air conditioning control device 1 or the air conditioning device 4.

The input/output device 2 may be a remote controller or the like for the air conditioning device 4, or may be a smartphone, a tablet or a general-purpose computer such as a PC having a keyboard, a mouse, a touch panel, switches or a display. Further, the input/output device 2 may be included in the air conditioning device 4.

The instruction reception device 3 is such that receives an instruction from another device and causes the air conditioning device 4 to operate in accordance with the instruction. Though the instruction reception device 3 is shown outside the air conditioning device 4 in FIG. 1, the instruction reception device 3 may be inside the air conditioning device 4 or may be inside the air conditioning control device 1 or the input/output device 2.

The air conditioning device 4 changes its operating state based on an instruction from the instruction reception device 3. The air conditioning device 4 has various operating states, such as air cooling, air warming, ventilation, dehumidification and stop, but the operating states are not especially limited.

Here, a targeted predetermined space is simply referred to as a room, and an inside of the space and an outside of the space are referred to as an inside of the room and an outside of the room, respectively. The targeted predetermined space, however, is not limited to one area in a structure but may be the entire structure or an entire floor of a building.

The air conditioning device 4 is, for example, an air conditioner for a building and is assumed to be provided with an outdoor unit 41 to perform heat exchange between a heating medium and air outside a room, and an indoor unit 42 to perform heat exchange between a heating medium and air inside the room to adjust temperature inside the room. The configuration of the air conditioning device 4, however, is not especially limited. Further, the air conditioning device 4 may have an internal sensor 43 to measure temperature inside or near the air conditioning device 4.

The air conditioning device 4 or the air conditioning control device 1 may be provided with a feedback controller to perform feedback control based on information about measurement by the internal sensor 43 of the air conditioning device 4 or an external sensor not illustrated after an instruction to the air conditioning device 4 is given. For example, when a predetermined period elapses after the air conditioning device 4 receives an instruction, the feedback controller may judge whether the instruction has been carried out or not and continue the instruction.

Next, an internal configuration of the air conditioning control device 1 will be described.

The history acquirer 11 acquires history about instructions (operations) given to the air conditioning device 4 from the input/output device 2. Here, this history is referred to as operation history. The operation history is used for calculation of the control period performed by the control period calculator 14.

The operation history is acquired from the input/output device 2. Note that, the operation history may be acquired from the instruction reception device 3 or the air conditioning device 4 when the instruction reception device 3 or the air conditioning device 4 can recognize whether an instruction is from the input/output device 2 and when which is recorded in the operation history.

The history acquirer 11 may dynamically make an inquiry to acquire the operation history or may wait until the operation history is sent.

Further, the history acquirer 11 may acquire history about room temperature. Here, this history is referred to as room temperature history. The room temperature history is used for the control instructor 15 to judge whether or not to instruct control.

The room temperature history is recorded by the internal sensor 43 of the air conditioning device 4, and it is assumed that the history acquirer 11 acquires the room temperature history from the air conditioning device 4. Otherwise, the room temperature history may be recorded by an external sensor not illustrated, and the history acquirer 11 may acquire the room temperature history from the external sensor.

Further, the history acquirer 11 may acquire history about operating states of the air conditioning device 4 from the air conditioning device 4. Here, this history is referred to as work history.

The history storage 12 stores the operation history and control history. The control history means history about instructions (controls) given to the air conditioning device 4 from the air conditioning control device 1. The control history is used for calculation of the control period performed by the control period calculator 14. The history storage 12 may also store the temperature history and the work history.

FIG. 2 is a diagram illustrating an example of information stored in the history storage 12. In the example of FIG. 2, the operation history, the control history, the room temperature history and the work history are merged. The history storage 12 may merge the histories and store the merged histories in one table in this manner or may store the histories separately.

Dates and time when history is recorded are illustrated in the first column of "Date and Time". Operating states of the air conditioning device 4 are illustrated in the second column of "Operating State". For example, "air cooling" means that the air conditioning device 4 is performing air cooling; and "stop" means that the air conditioning device 4 is in a stop state. The stop state may be a state that power supply to the air conditioning device 4 is stopped or may be a power saving state.

In the third column of "Set Temperature", set temperatures of the air conditioning device 4 are illustrated. In the fourth column of "Room Temperature", room temperatures are illustrated. The room temperature may be calculated based on temperatures measured by a plurality of sensors. For example, The room temperature may be set to one of the temperatures or average of the temperatures. This is also applicable to other room temperature described below.

The fifth column "Input Source" indicates that the operating state of the air conditioning device 4 has changed in response to an instruction to the air conditioning device 4 from the air conditioning control device 1 or the input/output device 2; and "system" indicates that the instruction is from the air conditioning control device 1. Therefore, it is seen that change of the operating state from "air cooling" to "stop" illustrated in the third line from the top is caused by control of the air conditioning control device 1. The information illustrated in the third line from the top can be said to be control history.

Further, "user" indicates that the instruction is from an input device. Therefore, it is seen that the action of causing the state to be "air cooling" illustrated in the seventh line from the top is performed by the user or the like who has operated the input/output device 2. The information illustrated in the seventh line from the top can be said to be operation history.

The lines in which neither "system" nor "user" is recorded show not history recorded based on an instruction to the air conditioning device 4 from the air conditioning control device 1 or the input/output device 2 but history periodically recorded by the air conditioning device 4. The information illustrated in these lines can be said to be work history.

Since an operating state of the air conditioning device 4 is recorded in each of all the lines in FIG. 2, all the lines can be said to be work history. Further, since room temperature is recorded in each of all the lines, all the lines can be also said to be room temperature history.

The history storage 12 acquires and stores control history from the control instructor 15 which sends an instruction to the air conditioning device 4. The control history may be acquired from the instruction reception device 3 or the air conditioning device 4 via the history acquirer 11 when the instruction reception device 3 or the air conditioning device 4 can recognize whether an instruction is from air conditioning control device 1 and when which is recorded in the control history.

The control rule storage 13 stores information about control over the air conditioning device 4. Here, the information about control is referred to as control rules. It is assumed that the control rules are stored in the control rule storage 13 in advance. Further, the number of control rules may be one or more.

FIG. 3 is a diagram illustrating an example of the control rules stored in the control rule storage 13. Each line of the table of FIG. 3 indicates one control rule. The control rules illustrated in FIG. 3 relate to air cooling, and the control rules are separated according to each set temperature before control.

A control condition (application condition), which is constituted by "Operating Condition Before Control" of the first column and "Set Temperature Before Control" of the second column, indicates a condition for applying control. Here, "Set Temperature Before Control" refers to a value when room temperature is stable. For example, the control rule of the third line from the top is applied when the operating state before control is air cooling, and the room temperature before control becomes stable. It is assumed that stabilization of temperature means that change of temperature in a predetermined period is within a predetermined range. For example, if the change is between 26.5° C. and 27.4° C. in a fixed period of 5 minutes, the temperature is regarded as having been stable at 27° C.

Content of control of each of the third to fifth columns means content of control performed when the control condition is satisfied. The content of control here is control for reduction in power consumption (power use) of the air conditioning device 4, that is, for energy saving. For example, stop, decrease in set temperature during air warming, increase in set temperature during air cooling, change to a ventilation mode during air cooling, and the like are included. It is assumed that power consumption of ventilation is smaller than that of air cooling and that an energy saving effect can be obtained by the operating state being switched from air cooling to ventilation.

"Operating State After Control" of the third column indicates an operating state of the air conditioning device 4 changed by control. "Set Temperature After Control" of the fourth column indicates set temperature set by the control. In the control rule of the sixth line from the top, though the operating state remains air cooling without being changed, the set temperature is assumed to be changed to 26° C. Thereby, the set temperature becomes higher than the set temperature before the control (25° C.), and power saving is achieved.

"Control Period" of the fifth column means a control period corresponding to a control rule. For example, in the control of the third line from the top, a time during which the air conditioning device 4 continues to stop is 10 minutes. In a case where a control rule having a control period is applied as described above, the content of control is maintained until the control period elapses after start of the control. However, when the user operates the air conditioning device 4 in the control period, the control ends. It is assumed that, after a time of stop elapses, the air conditioning device 4 returns to the original state. That is, in the case of the control rules illustrated in FIG. 3, the air conditioning device 4 returns the air cooling state, which is the operating state before the control. In order to return the air conditioning device 4 to the air cooling state, the control instructor 15 may give an instruction to return the air conditioning device 4 to the operating state before the control to the air conditioning device 4 again when the control period elapses. Otherwise, the instruction reception device 3 or the air conditioning device 4 may remember the control period and automatically return the air conditioning device 4 to the operating state before the control after the control period elapses.

"Control Permission" of the sixth column is for deciding whether execution of a control rule is possible or not. A control rule decided to be permitted is executed, while a control rule decided not to be permitted is not executed.

The control period calculator 14 calculates a control period of a control rule based on the control history and the operation history stored in the history storage 12. Further, the control period calculator 14 updates the control rule stored in the control rule storage 13 based on the calculated control period.

Calculation of the control period will be described. FIG. 4 is a diagram illustrating calculation of the control period. FIG. 4A is a diagram illustrating a survival time of each control rule calculated by the control period calculator 14. For example, it is supposed that the air conditioning control device 1 stops air cooling at 10:40, and the user causes air cooling to work at 11:00 as illustrated in FIG. 2. The control period calculator 14 detects the control, which the air conditioning control device 1 performed at 10:40, from the control history in the history storage 12 and then extracts a date and time of start of the control by the air conditioning control device 1 and a control rule (in FIG. 4, a control condition and content of the control) as illustrated in FIG. 4A. Then, the control period calculator 14 detects the operation, which the user performed at 11:00, from the operation history in the history storage 12, judges that the control by the air conditioning control device 1 has ended and acquires a date and time of start of the operation by the user. From the date and time of start of the control by the air conditioning control device 1 and the date and time of start of the operation by the user, the survival time of the control by the air conditioning control device 1 is calculated as 20 minutes.

FIG. 4B is a diagram illustrating a relationship between the control period and the survival time in the above example. Though the stop state of the air conditioning device 4 was schedule to be maintained during the control period from start of the control and a scheduled end of the control, the air conditioning device 4 is in the air cooling state after the operation. That is, the survival time is a time until the control cannot be maintained, by an operation or the like after start of the control, that is, the survival time means a time during which the control by the air conditioning control device 1 is actually continued, as illustrated in FIG. 4B. The survival time of each control by the air conditioning control device 1 is calculated in this way and recorded as in FIG. 4A.

The control period calculator 14 may judge whether or not to use a survival time as a sample after calculating the survival time. For example, 60 minutes or more and the like, such a sample that the survival time is judged to be too long may not be used as a sample because, in that case, a possibility that the user has gone out of the room is strong. A criterion may be used for judging whether or not to use a calculated survival time as a sample and may be determined freely.

FIG. 4C is a diagram illustrating an approximate graph of a survival function for calculating a control period from a plurality of calculated survival time samples. First, the control period calculator 14 calculates a survival function from sample data of the survival times illustrated in FIG. 4A. The survival function shows a survival rate which is a probability of survival (continuance) of control at certain time. The survival function can be calculated, for example, with the use of the Kaplan-Meier estimation method, the Weibull distribution or the like. Then, the control period calculator 14 calculates a time until the survival rate becomes equal to or below a predetermined threshold (in FIG. 4, s0), as a control period. In this way, a control period for each control rule is calculated.

Here, it is assumed that a plurality of survival times are calculated for each control rule, and a control period is calculated from the survival times. The control period, however, may be calculated based on a plurality of survival times calculated for each of control rule elements or for each combination of elements. The control rule elements are elements of a control condition and elements of content of control, for example, an operating state before the control, set temperature before the control, an operating state after the control, set temperature after the control, and the like.

The control instructor 15 gives an instruction based on a control rule to the air conditioning device 4 via the instruction reception device 3. For example, an instruction based on the control rule illustrated in the third line of FIG. 3 is an instruction to maintain the stop state, which is the content of the control, until a control period of 10 minutes elapses after start of the control. The control instructor 15 confirms whether the control condition of the control rule stored in the control rule storage 13 is satisfied or not. If the control condition is satisfied, the control instructor 15 gives an instruction based on the content of control of the control rule.

The control instructor 15 may judge whether the control condition is satisfied or not on the basis of the temperature history in the history storage 12. The confirmation of whether the control condition is satisfied may be periodically performed or may be performed, for example, when it is notified from the history storage 12 that room temperature history has been added.

Further, when having given an instruction to the instruction reception device 3, the control instructor 15 notifies the content of the instruction to the history storage 12, and the history storage 12 stores the content of the instruction as control history.

Figure 5:
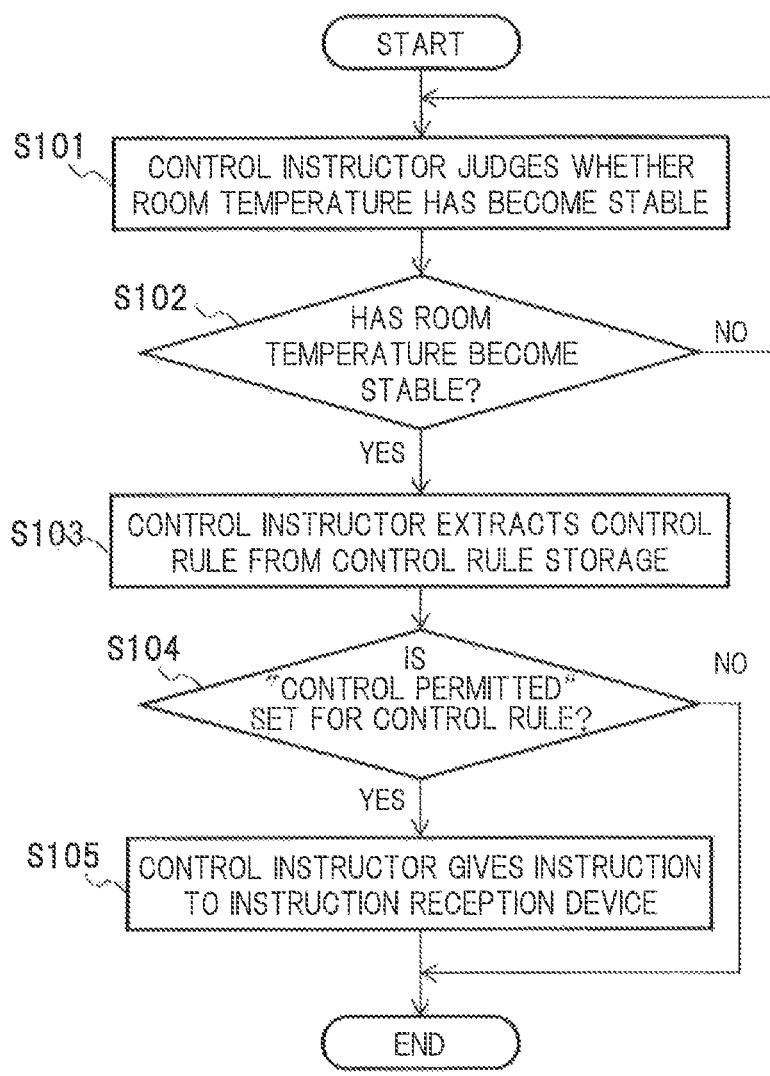
FIG. 5 is a flowchart of a control process of an air conditioning control device according to the first embodiment.

Next, a flow of a process of the air conditioning control device 1 according to the present embodiment will be described. FIG. 5 is a flowchart of a control process of the air conditioning control device 1 according to the first embodiment. The present flow is assumed to be started in response to power supply or an instruction from the user or the like. Further, it is assumed that necessary information is already stored in the history storage 12 and the control rule storage 13.

The control instructor 15 refers to the room temperature history in the history storage 12 to judge whether room temperature has become stable (S101). If judging that the room temperature is not stable (S102: NO), the control instructor 15 waits until the next judgment occasion and then performs the judgment again. The next judgment occasion may be a predetermined timing or may be the time when update of the room temperature history is notified from the history acquirer 11. If judging that the room temperature has become stable (S102: YES), the control instructor 15 refers to the control rule storage 13 and extracts a control rule satisfying the control condition among the control rules (S103).

If the "Control Permission" item of the extracted control rule is set to "unpermitted" (S104: NO), the present flow ends. If the "Control Permission" item of the extracted control rule is set to "permitted" (S104: YES), the control instructor 15 gives an instruction based on the content of control of the control rule to the instruction reception device 3 (S105). Thereby, the instruction reception device 3 controls the air conditioning device 4.

The flowchart described here is an example, and the flow is not limited to the flowchart. Other processes may be included. The same goes for the flowchart described below.

Figure 6:
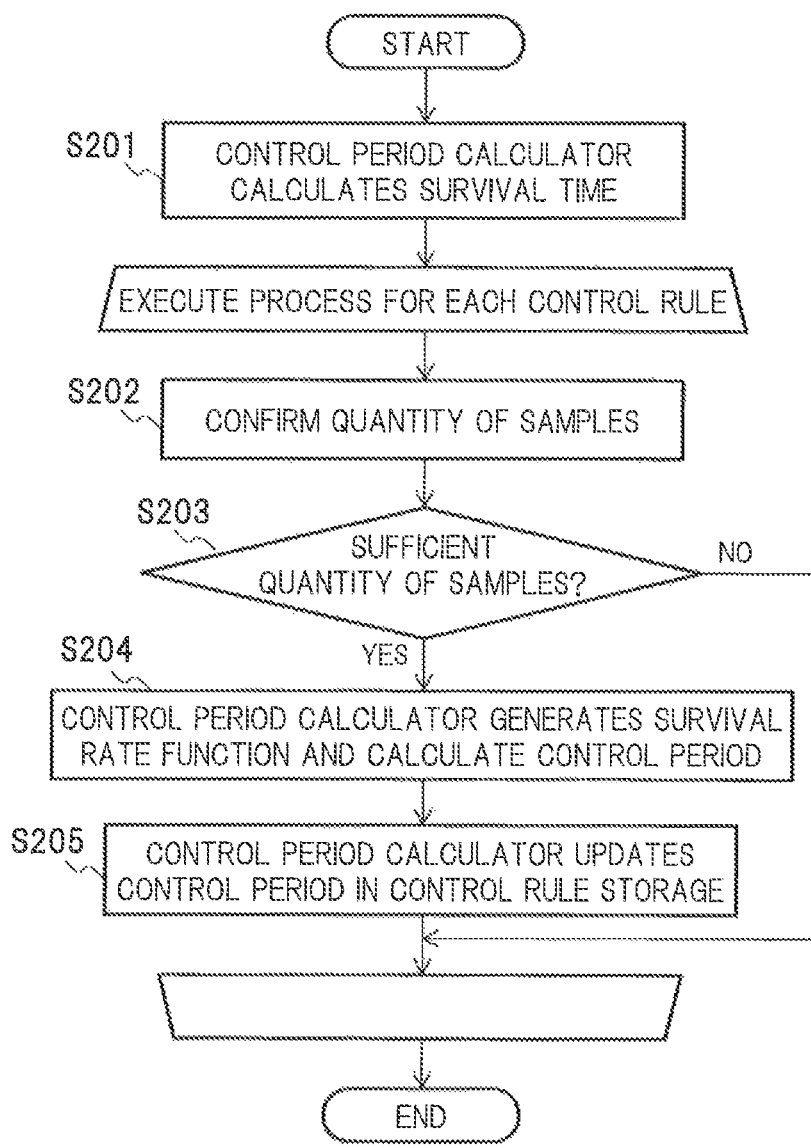
FIG. 6 is a flowchart of a control rule update process of the air conditioning control device according to the first embodiment.

FIG. 6 is a flowchart of a control rule update process of the air conditioning control device 1 according to the first embodiment. The present flow is assumed to be started at a predetermined timing or in response to an instruction from the user or the like. Further, it is assumed that necessary information is already stored in the history storage 12 and the control rule storage 13.

The control period calculator 14 detects the control history and the operation history stored in the history storage 12 and then calculates a survival time for each control rule of the air conditioning control device 1 (S201). Then, a process for updating a control period (S202 to S205) is performed for each control rule.

First, the control period calculator 14 confirms whether there is a sufficient amount of sample data (calculated survival times) corresponding to a control rule (S202). If there is not sufficient amount of sample data (S203: NO), the control period calculator 14 transitions to confirmation about the next control rule. If there is a sufficient amount of sample data (S203: YES), the control period calculator 14 generates a survival function from the sample data and calculates a control period based on a predetermined threshold (S204). The control period calculator 14 sends the calculated control period to the control rule storage 13, and the control rule storage 13 updates the control period of a corresponding control rule (S205). Then, the control period calculator 14 transitions to the process for the next control rule. When the process is completed for all the control rules, the present flow ends.

Here, a survival time is calculated for each control rule. The survival time, however, may be calculated for each control rule element as described before.

As described above, according to the first embodiment, it is possible to determine an appropriate control period based on how the air conditioning device 4 is used, without using a notification from the user. Thereby, it is possible to perform power-saving control of the air conditioning device 4 while reducing the user's dissatisfaction about control.

Second Embodiment

In a second embodiment, the air conditioning control device 1 updates the values of the "Control Permission" item of the control rules illustrated in FIG. 3 so as to prevent a control rule which is uncomfortable for the user from being applied.

Figure 7:
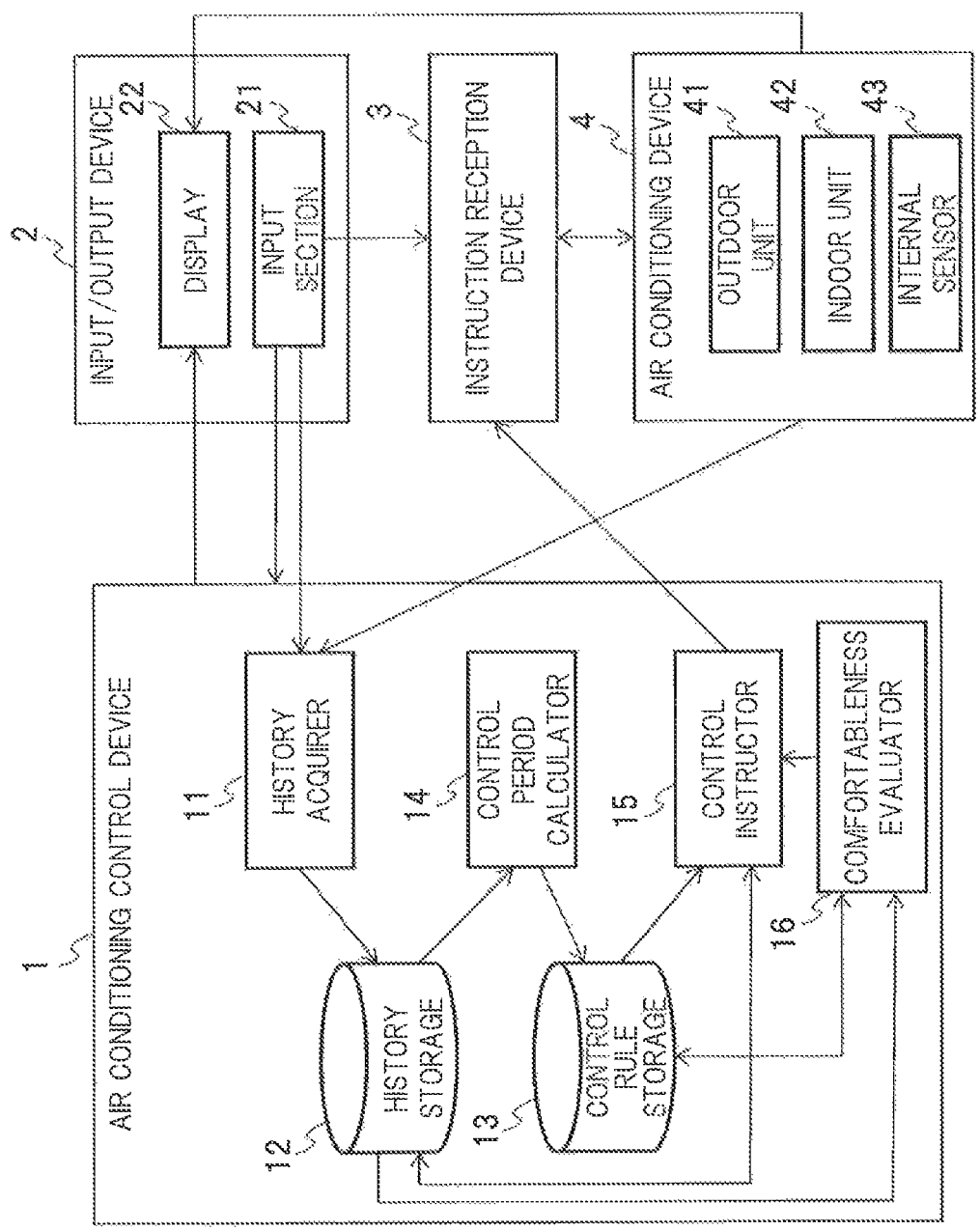
FIG. 7 is a block diagram illustrating a schematic configuration of an air conditioning system according to a second embodiment.

FIG. 7 is a block diagram illustrating a schematic configuration of an air conditioning system according to the second embodiment. The air conditioning control device 1 according to the second embodiment is different from the first embodiment in that a comfortableness evaluator 16 is further provided. Description of the same parts and processes as those of the first embodiment will be omitted.

The comfortableness evaluator 16 evaluates whether an applied control rule is comfortable or uncomfortable for the user, that is comfortableness, based on an operation by the user. As for a control rule judged to be uncomfortable, the "Control Permission" item of the control rule stored in the control rule storage 13 is updated from "permitted" to "unpermitted", so that the control rule is not instructed by the control instructor 15. Thereby, the user's dissatisfaction about control is decreased.

Consideration will be made, for example, on a case where the user controls the air conditioning device 4 to perform air cooling via the input/output device 2 during a period until a predetermined period elapses after the air conditioning device 4 stops air cooling by being controlled by the air conditioning control device 1. In such a case, it is considered that a situation of the control by the air conditioning control device 1 having been terminated by the user has occurred, and it is presumed that the control rule was uncomfortable for the user. Thus, when the situation of control by the air conditioning control device 1 being terminated by the user frequently occurs, it is thought that the control rule should not be applied.

As for the predetermined certain period described above, any period may be set freely if the period is equal to or shorter than the control period. Here, the predetermined certain period is referred to as an evaluation judgment period.

First, the comfortableness evaluator 16 confirms whether or not the situation of control being terminated from the input/output device 2 has occurred during a period until the evaluation judgment period has elapsed after control by the air conditioning control device 1 was performed, from the control history and the operation history in the history storage 12. Then, if the number of times that the situation of the control based on a certain control rule being terminated by the user occurs during the evaluation judgment period is equal to or larger than a predetermined threshold, the comfortableness evaluator 16 judges the control rule to be an uncomfortable control rule.

Then, the comfortableness evaluator 16 updates the "Control Permission" item of the control rule judged to be uncomfortable, which is stored in the control rule storage 13, to "unpermitted". Thereby, after the update, the control rule is not applied even if the control condition of the control rule is satisfied. The comfortableness evaluator 16 may change the rule changed to "unpermitted" to "permitted" when a certain time elapses after the rule is updated to "unpermitted".

Figure 8:
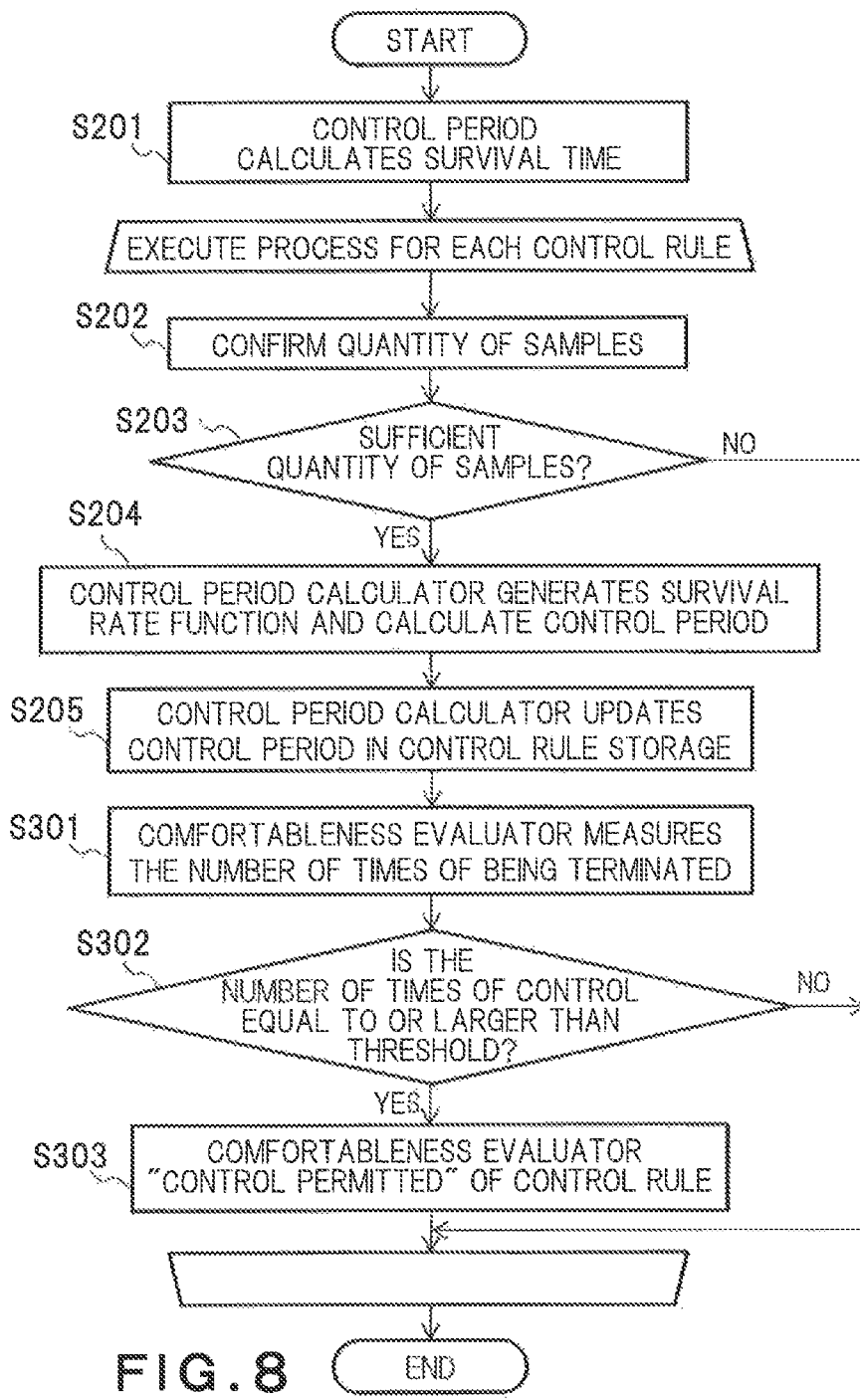
FIG. 8 is a flowchart of a control rule update process of an air conditioning control device according to the second embodiment.

Next, a flow of the comfortableness evaluation process will be described. FIG. 8 is a flowchart of a control rule update process of the air conditioning control device 1 according to the second embodiment. Here, it is assumed that the comfortableness evaluation process is performed as a part of the control rule update process. The comfortableness evaluation process may be performed separately from the control rule update process.

The processes from S201 to S205 are the same as those of the first embodiment. After the process of S205, the comfortableness evaluator 16 refers to the control history and the operation history in the history storage 12 to count the number of times of the control being terminated by the user within the evaluation judgment period (S301). If the number of times of being terminated is smaller than the threshold (S302: NO), the comfortableness evaluator 16 transitions to the process for the next control rule. If the number of times of being terminated equal to or larger than the threshold (S302: YES), the "Control Permission" item of the control rule stored in the control rule storage 13 is updated to "unpermitted". Then, the comfortableness evaluator 16 transitions to the process for the next control rule. When the process is completed for all the control rules, the present flow ends.

In the above flow, the process is performed for all the target control rules. However, it is also possible to confirm the "Control Permission" items of the control rules before S301 and do not perform the processes from S301 to S303 for control rules for which "unpermitted" is set.

As described above, according to the second embodiment, it is possible to judge whether control is comfortable or uncomfortable based on how the air conditioning device 4 is used, without using a notification from the user, and it is possible to prevent control by a control rule judged to be uncomfortable from being performed. Thereby, the user's dissatisfaction about control can be reduced.

Third Embodiment

Figure 9:
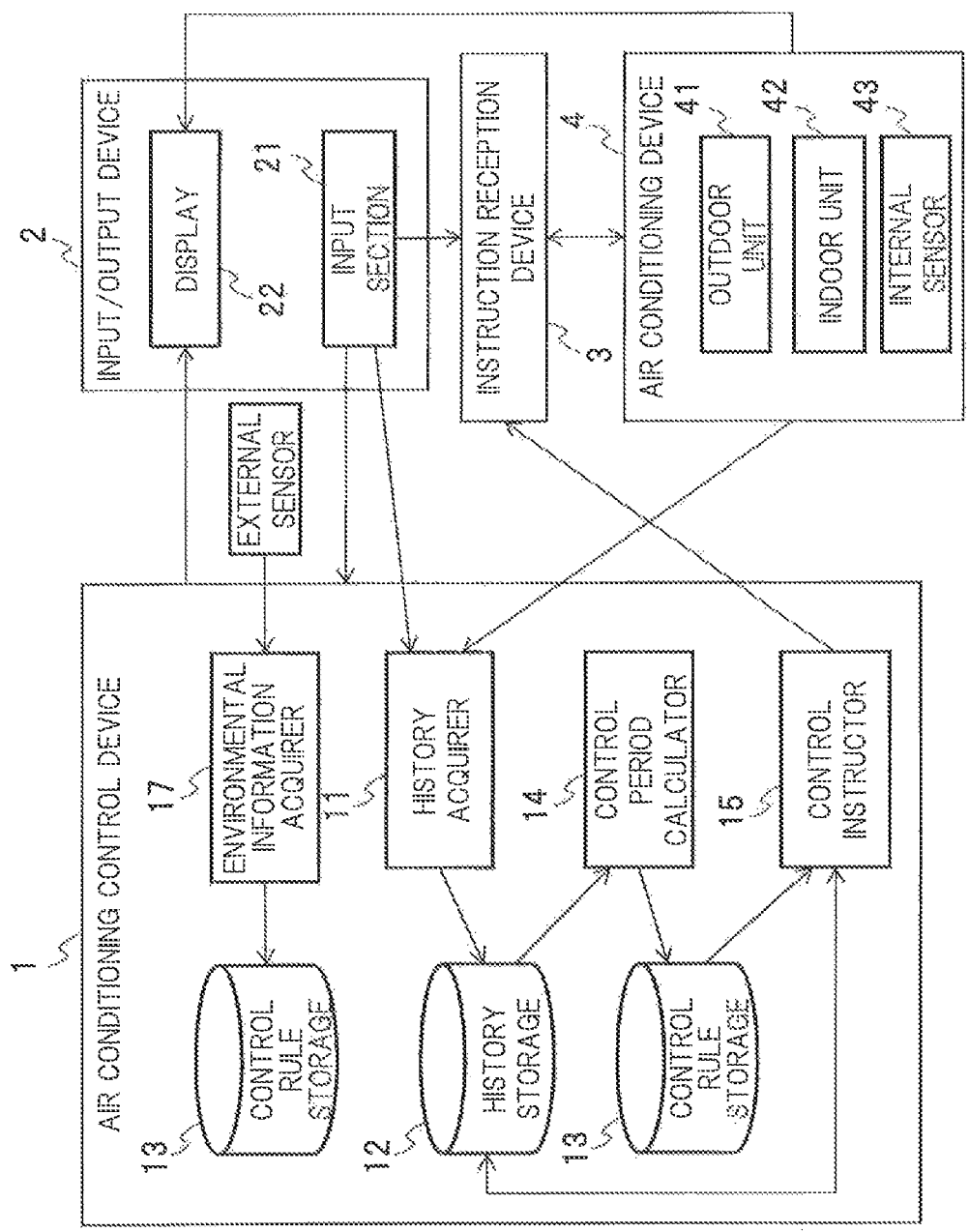
FIG. 9 is a block diagram illustrating a schematic configuration of an air conditioning system according to a third embodiment.

In a third embodiment, the control period is calculated based on an environment in the vicinity of the air conditioning device 4. FIG. 9 is a block diagram illustrating a schematic configuration of an air conditioning system according to the third embodiment. The air conditioning system according to the third embodiment is different from the first and second embodiments in that an external sensor 5 included. Further, the air conditioning control device 1 according to the third embodiment is different from the first and second embodiments in that an environmental information acquirer 17 and an environmental history storage 18 are further provided. Description of the same parts and processes as those of the first and second embodiments will be omitted.

The environmental information acquirer 17 acquires environmental information about the environment in the vicinity of the air conditioning device 4. The vicinity may be the inside of a room or the outside of the room. The environmental history storage 18 stores the acquired environmental information. FIG. 10 is a diagram illustrating an example of the environment information stored in the environmental history storage 18. Measured dates and time, attributes and attribute values are illustrated. The attributes are not especially limited as far as they indicate the environment of the vicinity of the air conditioning device 4. For example, room temperature, external temperature (temperature outside the room), an amount of rainfall, humidity, wind velocity and the like are included the attributes.

Here, it is assumed that the environmental information is measured by the external sensor 5 and transmitted from the external sensor 5 to the environmental information acquirer 17. The environmental information acquirer 17, however, may acquire the environmental information not from the external sensor 5 but from a server or a cloud service providing environmental information, and a source where the environmental information acquirer 17 acquires the environmental information may be determined freely.

Further, the environmental information may not be actually measured information but may be estimated information. For example, weather forecast information provided by the Meteorological Agency or the like is possible.

It is assumed that the environmental information is used when the control period calculator 14 calculates a control period. The control period calculator 14 may calculate a control period of control performed in the environmental state based on a survival time calculated for each environmental state shown by an environmental information attribute or a combination of environmental information attributes.

If the internal sensor 43 of the air conditioning device 4 can acquire environmental information, the environmental information acquired by the internal sensor 43 may be used.

Since a flow of a control rule update process of the air conditioning control device 1 according to the third embodiment is the same as that of the first or second embodiment, the flow will be omitted.

As described above, according to the third embodiment, it is possible to, by calculating a control period using environmental information, cause the control period to be of a value corresponding to a more suitable situation. Thereby, the user's dissatisfaction about control can be further decreased.

Fourth Embodiment

In a fourth embodiment, energy saving efficiency of a control rule is evaluated and a value of the "Control Permission" item of the control rule is updated based on an evaluation result to prevent such a control rule that does not achieve energy saving from being applied.

Figure 11:
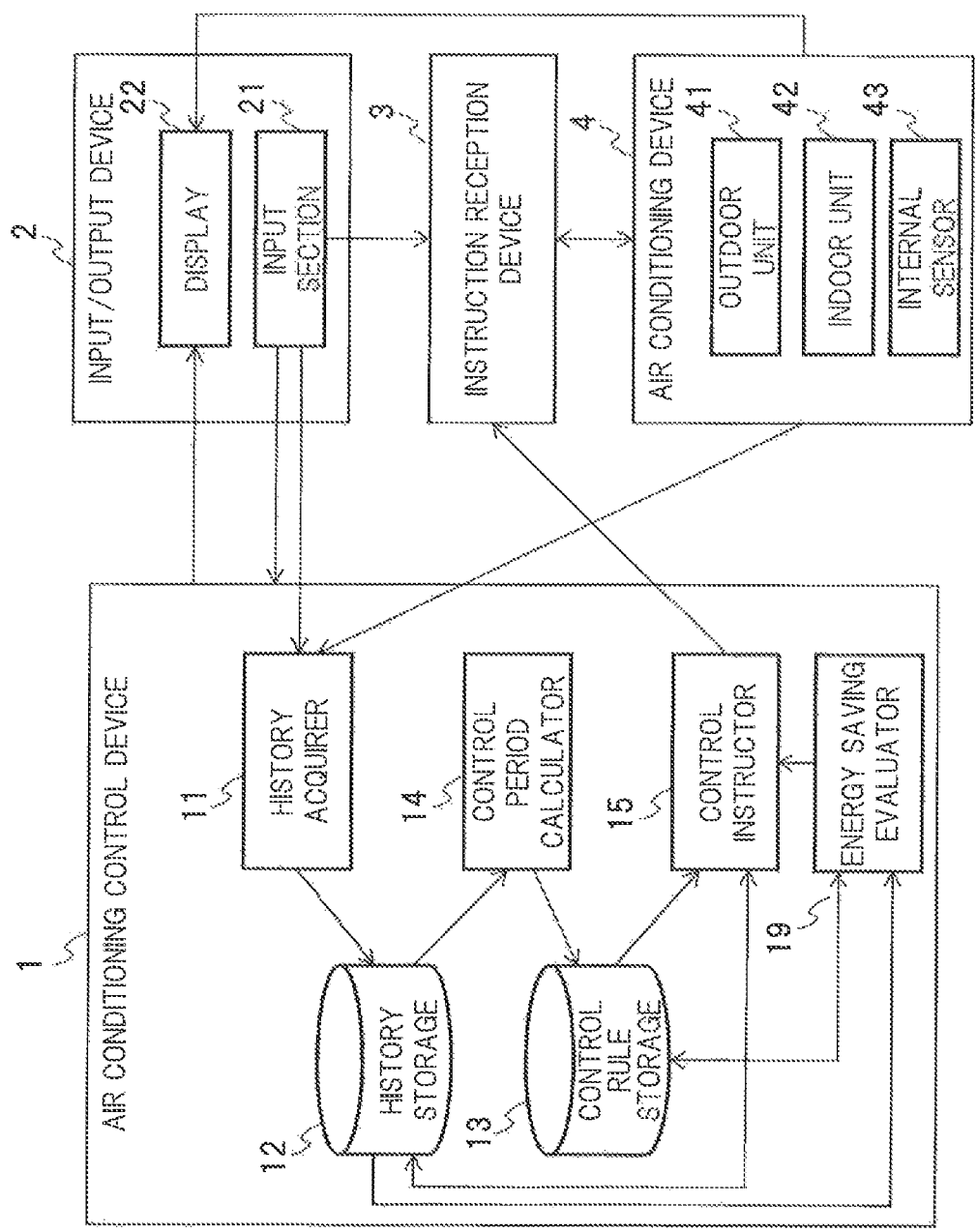
FIG. 11 is a block diagram illustrating a schematic configuration of an air conditioning system according to a fourth embodiment.

FIG. 11 is a block diagram illustrating a schematic configuration of an air conditioning system according to the fourth embodiment. The air conditioning control device 1 according to the fourth embodiment is different from the first to third embodiments in that an energy saving evaluator 19 is further provided. Description of the same parts and processes as those of the first to third embodiments will be omitted.

Even if the air conditioning control device 1 controls the air conditioning device 4, power saving is not necessarily achieved. Therefore, the energy saving evaluator 19 compares power consumption of the air conditioning device 4 in a case where control is not applied with power consumption of the air conditioning device 4 with the power consumption in a case where the control is applied to evaluate energy saving efficiency.

Power consumption can be measured by the internal sensor 43 of the air conditioning device 4 or the external sensor 5. Further, power consumption may be estimated from measured room temperature, an area of target space, specific heat and the like instead of being directly measured. Here, history about power consumption is referred to as power consumption history.

FIG. 12 is a diagram illustrating another example of the environment information stored in the environmental history storage 18. The fourth and seventh lines from the top illustrate power consumption acquired by the external sensor 5. Therefore, the information illustrated in the fourth and seventh lines from the top can be said to be power consumption history. Thus, power consumption acquired by the internal sensor 43 of the air conditioning device 4 or the external sensor 5 is stored in the history storage 12 or the environmental history storage 18.

Figure 13A:
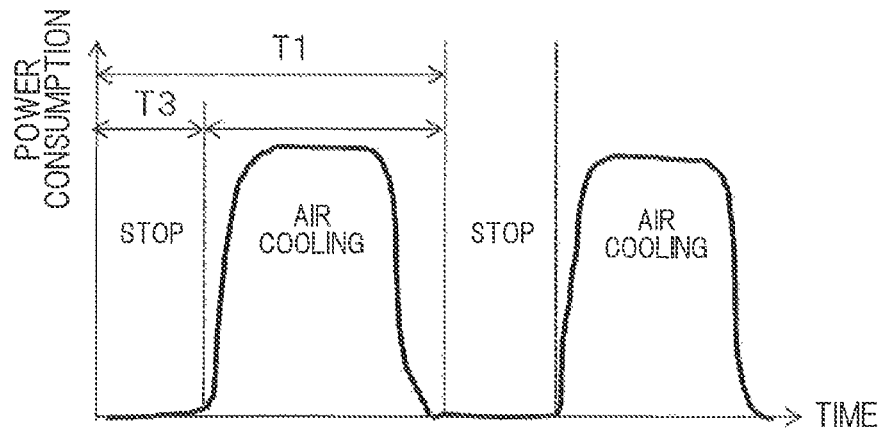
FIGS. 13A, 13B and 13C are diagrams illustrating a method for evaluating energy saving efficiency.
Figure 13B:
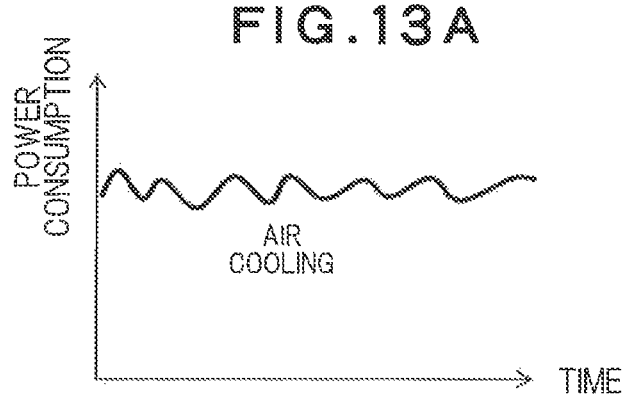
Figure 13C:
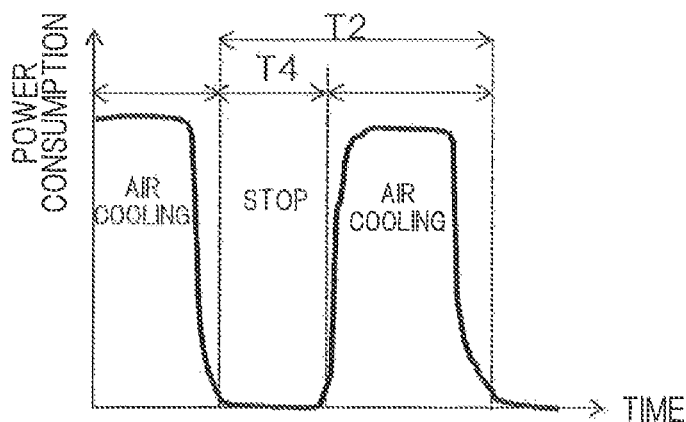

FIGS. 13A, 13B and 13C are diagrams illustrating a method for evaluating energy saving efficiency. The graph of FIG. 13A illustrates power consumption of the air conditioning device 4 in a case where a control rule is applied. Because control periods exist, a period during which the air conditioning device 4 is controlled (in FIG. 13, a period during which the air conditioning device 4 is stopped) and a period during which the air conditioning device 4 is not controlled (in FIG. 13, a period during which the air conditioning device 4 performs air cooling) are repeated, and, therefore, the graph of FIG. 13A fluctuates up and down.

The graphs of FIGS. 13B and 13C show power consumption of the air conditioning device 4 in a case where a control rule is not applied, and room temperature is stable. FIG. 13B shows power consumption of the air conditioning device 4 mounted with an inverter. FIG. 13C shows power consumption of the air conditioning device 4 which is not mounted with an inverter.

When the room temperature is stable, the power consumption of the air conditioning device 4 mounted with an inverter is stable as in FIG. 13B. On the other hand, even if the room temperature is stable, the power consumption of the air conditioning device 4 which is not mounted with an inverter fluctuates up and down as in FIG. 13C. This is because the air conditioning device 4 which is not mounted with an inverter performs an intermittent operation of repeating a period of discharging cool air and a period of not discharging cool air even if the room temperature is stable.

Existence/nonexistence of power saving efficiency can be confirmed by comparing average power consumption W1 per unit time in the case where a control rule is applied and average power consumption W2 per unit time in the case where the control rule is not applied, and the room temperature is stable.

The average power consumption W1 is indicated as $W1=\{W3 \times T3+E1\}/T1$ by consumption power W3 per unit time during stop, a control period T3, a sum total E1 of power consumption until the room temperature becomes stable after start of air cooling, and a period T1 until the room temperature becomes stable after stop (start of control).

In the case where the air conditioning device 4 is mounted with an inverter, power consumption is stable. Therefore, the average power consumption W2 can be obtained by extracting power consumption per unit time at the time when the room temperature is stable, from the power consumption history. In the case where the air conditioning device 4 is not mounted with an inverter, the average power consumption W2 is indicated as $W2=\{W4 \times T4+E2\}/T2$ by a product of power consumption W4 per unit time at the time of stop and a stop time T4, a sum total E2 of power consumption until the room temperature becomes stable after start of air cooling, and a period T2 until the room temperature becomes stable after stop.

If the average power consumption W1 is larger than the average power consumption W2, the energy saving evaluator 19 judges that an energy saving effect is obtained. Then, the energy saving evaluator 19 sets the "Control Permission" item of a control rule to "permitted" if judging that energy saving is achieved, and sets the "Control Permission" item of the control rule to "unpermitted" if judging that the energy saving effect is not obtained. Thereby, a control rule by which energy saving is not achieved is not instructed from the control instructor, and reliability of the energy saving effect by the air conditioning control device 1 is enhanced.

In the above description, it is assumed to use the power consumption history of the air conditioning control device 1. However, it is also possible to use power consumption history of another air conditioning device 4 the kind of which or the room area for which is similar. The above method for evaluating energy saving efficiency is an example. The energy saving effect may be judged by other methods.

Figure 14:
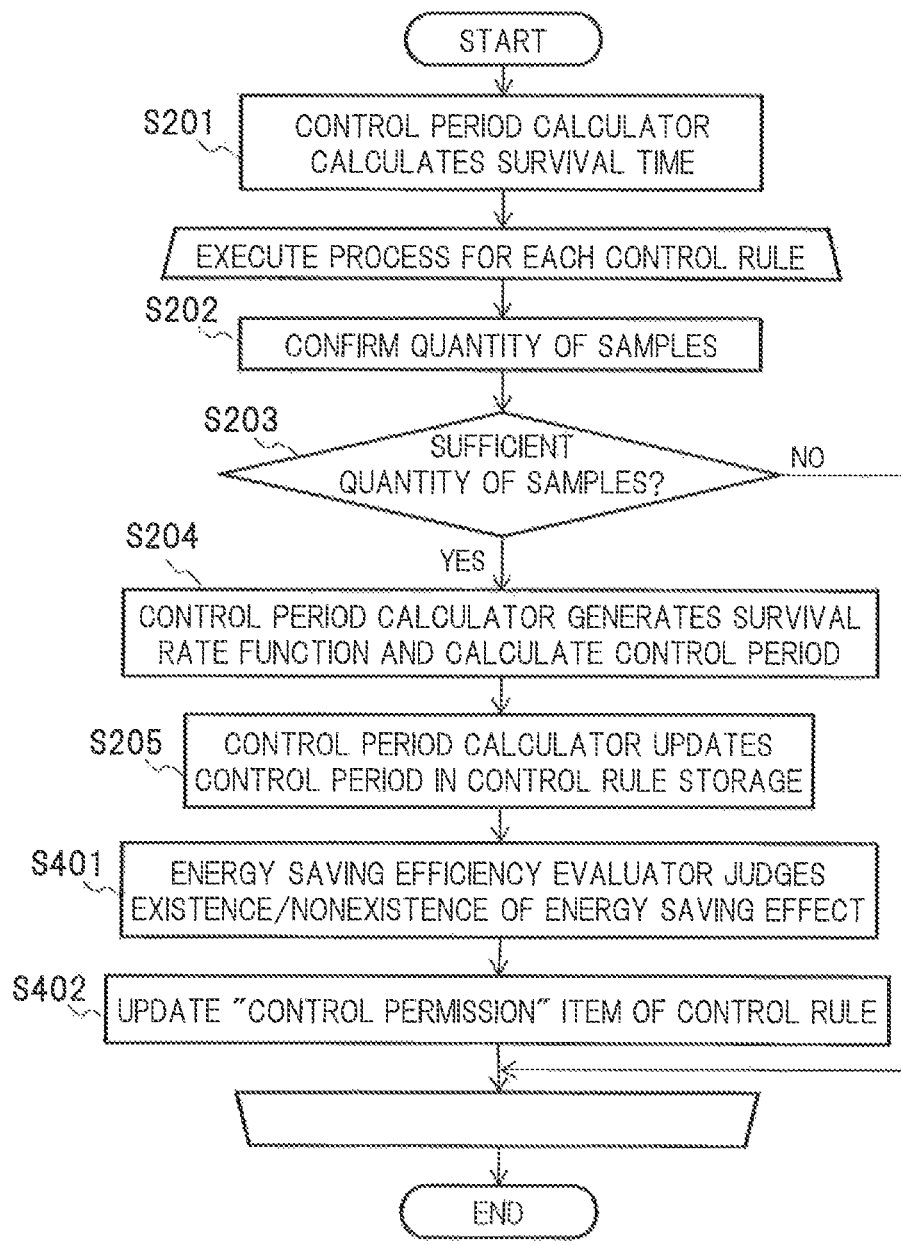
FIG. 14 is a flowchart of a control rule update process of an air conditioning control device according to the fourth embodiment.

Next, a flow of the energy saving efficiency evaluation process will be described. FIG. 14 is a flowchart of a control rule update process of the air conditioning control device 1 according to the fourth embodiment. Here, it is assumed that the energy saving efficiency evaluation process is performed as a part of the control rule update process. The energy saving efficiency evaluation process may be performed separately from the control rule update process. Further, when the comfortableness evaluation process is performed in the control rule update process, the energy saving efficiency evaluation process may be performed prior to the comfortableness evaluation process or may be performed after the comfortableness evaluation process.

The processes from S201 to S205 are the same as those of the first embodiment. After the process of S205, the energy saving evaluator 19 refers to the work history in the history storage 12 to calculate the average power consumption W1 and the average power consumption W2 and then judges existence/nonexistence of the energy saving effect by the control (S401). Then, the "Control Permission" item of the control rule stored in the control rule storage 13 is updated to "permitted" if power saving efficiency is obtained, and to "unpermitted" if power saving efficiency is not obtained (S402). Then, the energy saving evaluator 19 transitions to the process for the next control rule. When the process is completed for all the control rules, the present flow ends.

In the above flow, the process is performed for all the target control rules. However, it is also possible to confirm the "Control Permission" items of the control rules before S401 and do not perform the processes of S401 and S402 for control rules for which non-permission is set.

As described above, according to the fourth embodiment, existence/nonexistence of the energy saving effect is judged, and a control rule by which the energy saving effect is not obtained is not applied. Thereby, it is possible to enhance reliability of control.

The air conditioning control device 1 in the embodiments described so far is only required to be capable of communication for communicating necessary information to the air conditioning device 4 and the like. The communication may be performed via various communication networks such as a dedicated line, a WAN (wide area network), a LAN (local area network), the Internet and the like. As the communication networks, any of a wired network, a wireless network, and a hybrid network of wired and wireless networks is possible.

Figure 15:
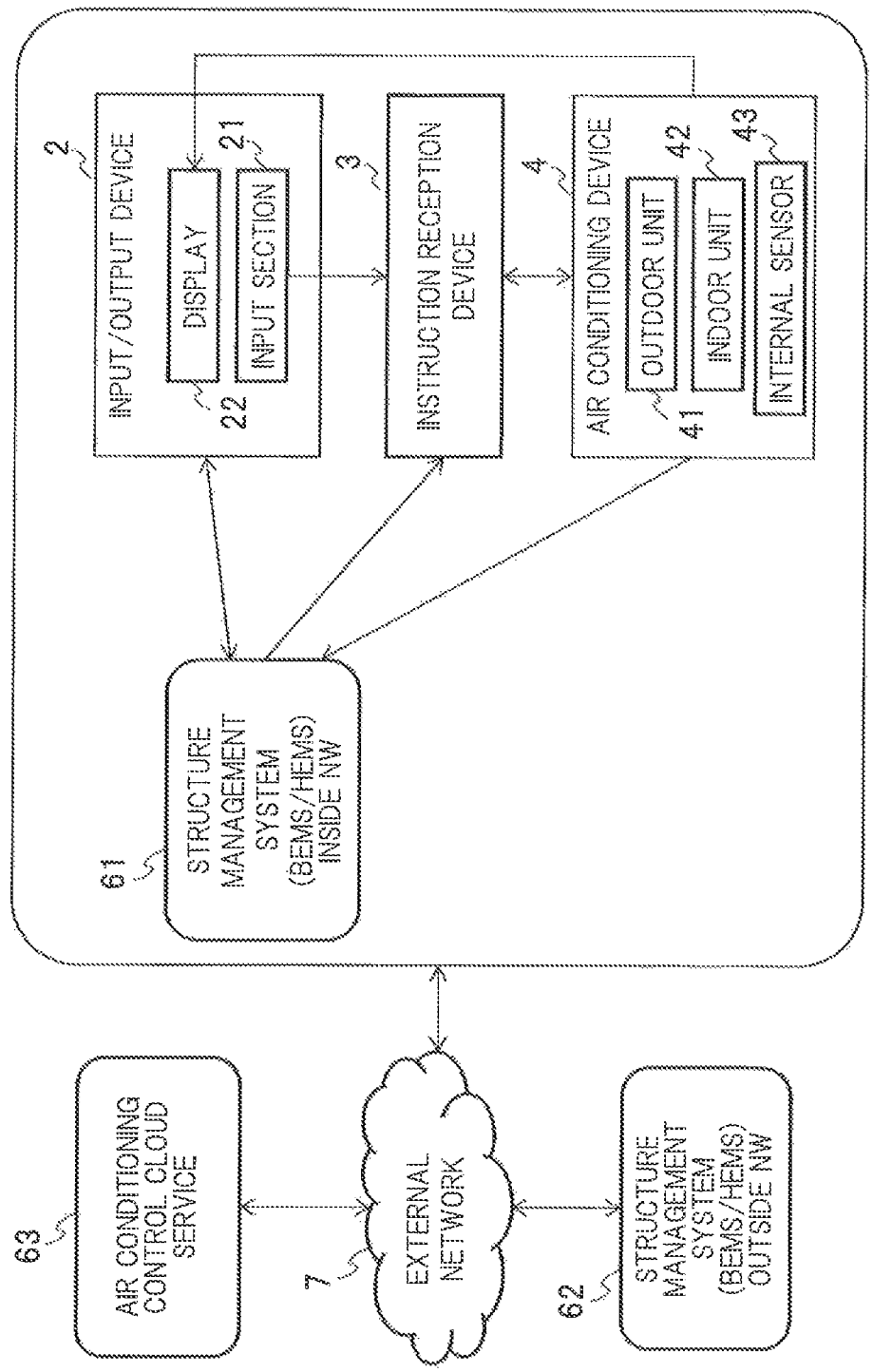
FIG. 15 is a conceptual diagram of an air condition control system.

FIG. 15 is a conceptual diagram of an aft condition control system. The air conditioning control device 1 in the embodiments described so far may be included in a structure management system, such as a BEMS (building energy management system) and an HEMS (home energy management system), which manages the whole structure in which the air conditioning device 4 is installed. Further, the structure management system may exist in the structure or the network where the air conditioning device 4, similar to a structure management system 61 in FIG. 15. Alternatively, the structure management system may exist in another network connected to an external network 7 or the like, similar to a structure management system 62 outside the network of FIG. 15.

Further, the air conditioning control device 1 may control the air conditioning device 4 as a cloud service which provides functions via the external network 7 or the like, such as an air conditioning control cloud service 63 of FIG. 15. Thus, the air conditioning control device 1 may be used as a BEMS (building energy management system), a HEMS (home energy management system), a cloud service or the like.

Each process in the embodiments described above can be implemented by software (program). Thus, the air conditioning control device in the embodiments described above can be implemented using, for example, a general-purpose computer apparatus as basic hardware and causing a processor mounted in the computer apparatus to execute the program.

Figure 16:
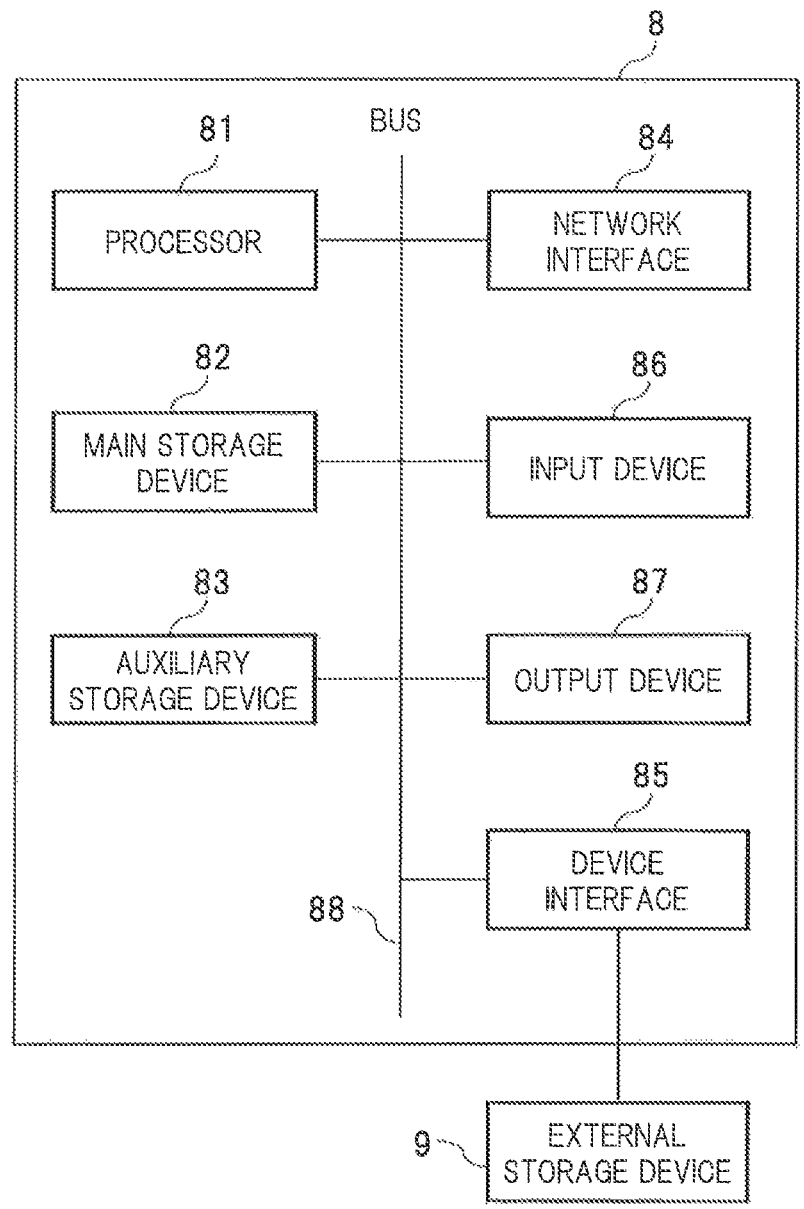
FIG. 16 is a block diagram illustrating an example of a hardware configuration realizing an air conditioning control device according to an embodiment of the present invention.

FIG. 16 is a block diagram illustrating an example of a hardware configuration realizing the air conditioning control device 1 according to an embodiment of the present invention. The air conditioning control device 1 can be realized as a computer device 8 provided with a processor 81, a main storage device 82, an auxiliary storage device 83, a network interface 84, a device interface 85, an input device 86 and an output device 87 which are connected via a bus 88.

By the processor 81 reading out the program from the auxiliary storage device 83, developing the program in the main storage device 82 and executing the program, the functions of the control period calculator 14, the control instructor 15, the comfortableness evaluator 16 and the energy saving evaluator 19 can be realized.

The air conditioning control device 1 of the present embodiments may be realized by installing the program to be executed by the air conditioning control device 1 in the computer device in advance or may be realized by distributing the program by storing the program into a storage medium such as a CD-ROM or via a network and appropriately installing the program into the computer device.

The network interface 84 is an interface for connecting to a communication network. The function of performing communication with other devices such as the history acquirer 11 and the environmental information acquirer 17 may be realized by the network interface 84. Though only one network interface is illustrated here, a plurality of network interfaces may be mounted. The kind of a communication network to be connected is not especially limited.

The device interface 85 is an interface for connecting to equipment such as an external storage device (external storage medium) 7. The external storage device 9 may be a freely-selected recording medium or storage device such as an HDD, CD-R, CD-RW, DVD-RAM, DVD-R and SAN (storage area network). The history storage 12, the control rule storage 13 and the environmental history storage 18 may be connected to the device interface 85 as the external storage devices 9.

The input device 86 is provided with input devices such as a keyboard, a mouse and a touch panel. An operation signal by an operation of the input device is outputted to the processor 81. The output device 87 is constituted by a display such as an LCD (liquid crystal display) and a CRT (cathode ray tube). The input device 86 or the output device 87 may be connected to the device interface 85 from the outside. The input/output device 2 may be realized as the input device 86 and the output device 87.

The main storage device 82 is a memory device to temporarily store an instruction to be executed by the processor 81, various data and the like and may be a volatile memory such as a DRAM or a nonvolatile memory such as an MRAM. The auxiliary storage device 83 is a storage to permanently store programs, data and the like and is, for example, an HDD, an SSD or the like. Data held by the history storage 12, the control rule storage 13, the environmental history storage 18 and the like is stored in the main storage device 82, the auxiliary storage device 83 or the external storage device 9.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An air conditioning control device comprising a processor configured to execute a program to provide at least:
   an acquirer that acquires control history and operation history from an external or internal device of the air conditioning control device, the control history comprising start times of air conditioning cycle controls over an air conditioning device and the operation history being about an operation of the air conditioning device;
   a control period calculator that calculates, based on the control history and the operation history, a plurality of survival times of the control,
   determines whether a threshold number of survival times has been calculated for a control rule associated with the control,
   in response to determining the threshold number of survival times has been calculated, calculate a survival function based on the plurality of survival times,
   calculate, based on the survival function, a control period during which the control is maintained, and
   update the control period in a control rule storage, wherein;
   the plurality of survival times indicate periods from a start of the control to a time at which the control is prevented by the operation from being maintained before a scheduled end of the control, and the survival function indicates a relation of an elapsed time from the start of the control and a probability that the control is maintained at the elapsed time; and
   a control instructor that gives an instruction to the air conditioning device to cause the control to be maintained until the control period elapses from a star of the control.

2. The air conditioning control device according to claim 1, further comprising:
   a history storage configured to store the control history and the operation history; and
   the control rule storage being configured to store an application condition of the control and the control period,
   wherein:
      the control period calculator updates the control period stored in the control rule storage to a calculated new control period; and
      the control instructor gives the instruction to the air conditioning device when the application condition is satisfied.

3. The air conditioning control device according to claim 1, wherein the control instructor gives the instruction to the air conditioning device when a temperature of a space targeted by air conditioning performed by the air conditioning device is included within a predetermined first range in a predetermined first period.

4. The air conditioning control device according to claim 1, wherein:
   the processor is configured to execute the program to further provide a comfortableness evaluator that evaluates comfortableness of the control based on the control history and the operation history; and
   the control instructor does not give an instruction on an uncomfortable control to the air conditioning device such that the air conditioning device does not perform the uncomfortable control, the uncomfortable control being evaluated to be uncomfortable by the comfortableness evaluator.

5. The air conditioning control device according to claim 4, wherein the comfortableness evaluator judges the control to be uncomfortable when the number of terminations of the control for the operation exceeds a predetermined threshold by a time that a predetermined second period elapses from the start of the control.

6. The air conditioning control device according to claim 1, wherein:
   the processor is configured to execute the program to further provide:
   an environmental information acquirer that acquires environmental information about an environment in a vicinity of the air conditioning device; and an environmental history storage configured to acquire the environmental information; and
   the control period calculator acquires the survival time in a predetermined environmental state and calculates the control period of the control performed in the predetermined environmental state, based on the environmental information, the control history and the operation history.

7. The air conditioning control device according to claim 1, wherein: the processor is configured to execute the program to further provide an energy saving evaluator that judge existence/nonexistence of an energy saving effect of the control based on power consumption of the air conditioning device in a case where the control is not applied and power consumption in a case where the control is applied; and the control instructor does not give the instruction to the air conditioning device when the control is judged not to have the energy saving effect by the energy saving evaluator.

8. The air conditioning control device according to claim 1, wherein: the control period calculator determines whether the threshold number of survival times has been calculated by determining whether a number of termination times is below a threshold; and the control period calculator, in response to determining that the threshold number of survival times have not been calculated, transition to confirmation of a different control rule without updates to the control period.

9. An air conditioning control method executed by a computer, the method comprising:

acquiring control history and operation history, the control history comprising start times of air conditioning cycle controls over an air conditioning device and the operation history being about an operation of the air conditioning device;

calculating, based on the control history and the operation history, a plurality of survival times of the control indicating periods from a start of the control to a time at which the control is prevented by the operation from being maintained before a scheduled end of the control;

determining whether a threshold number of survival times has been calculated for a control rule associated with the control, in response to determining the threshold number of survival times has been calculated, calculating a survival function based on the plurality of survival times;

calculating, based on the survival function, a control period during which the control is maintained, the survival function indicating a relation of an elapsed time from the start of the control and a probability that the control is maintained at the elapsed time;

giving an instruction to the air conditioning device to cause the control to be maintained until the control period elapses after start of the control, and update the control period in a control rule storage.

10. The air conditioning control method according to claim 9, wherein: determining whether the threshold number of survival times has been calculated comprises determining whether a number of termination times is below a threshold; and the method further comprises, in response to determining that the threshold number of survival times have not been calculated, transitioning to confirmation of a different control rule without updates to the control period.

11. A non-transitory computer readable medium having a computer program stored therein which causes a computer to perform processes comprising:

acquiring control history and operation history, the control history comprising start times of air conditioning cycle controls over an air conditioning device and the operation history being about an operation of the air conditioning device;

calculating, based on the control history and the operation history, a plurality of survival times of the control indicating periods from a start of the control to a time at which the control is prevented by the operation from being maintained before a scheduled end of the control;

determining whether a threshold number of survival times has been calculated for a control rule associated with the control, in response to determining the threshold number of survival times has been calculated, calculating-a survival function based on the plurality of survival times, calculating, based on the survival function, a control period during which the control is maintained, the survival function indicating a relation of an elapsed time from the start of the control and a probability that the control is maintained at the elapsed time;

giving an instruction to the air conditioning device to cause the control to be maintained until the control period elapses after start of the control; and updating the control period in a control rule storage.

12. The non-transitory computer readable medium according to claim 11, wherein:

determining whether the threshold number of survival times has been calculated comprises determining whether a number of termination times is below a threshold; and the processes further comprise, in response to determining that the threshold number of survival times have not been calculated, transitioning to confirmation of a different control rule without updates to the control period.

* * * * *

UNITED STATES PATENT AND TRADEMARK OFFICE
CERTIFICATE OF CORRECTION

PATENT NO. : 10,941,950 B2
APPLICATION NO. : 15/265962
DATED : March 9, 2021
INVENTOR(S) : Ryosuke Takeuch et al.

It is certified that error appears in the above-identified patent and that said Letters Patent is hereby corrected as shown below:

In the Claims

Claim 1, Column 16, Line 3, "from a star of the" should read --from a start of the--.

Claim 7, Column 16, Line 63, "judge" should read --judges--.

Claim 11, Column 18, Line 23, "calculating-a" should read --calculating a--.

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*